United States Patent
French

(10) Patent No.: US 9,664,321 B2
(45) Date of Patent: May 30, 2017

(54) CLEAN AIR DUCT AND RETAINING CLIP AND ASSEMBLY THEREOF

(71) Applicant: STEERE ENTERPRISES, INC., Tallmadge, OH (US)

(72) Inventor: Douglas French, Stow, OH (US)

(73) Assignee: STEERE ENTERPRISES, INC., Tallmadge, OH (US)

( * ) Notice: Subject to any disclaimer, the term of this patent is extended or adjusted under 35 U.S.C. 154(b) by 399 days.

(21) Appl. No.: 14/280,784

(22) Filed: May 19, 2014

(65) Prior Publication Data

US 2014/0338773 A1 Nov. 20, 2014

Related U.S. Application Data

(60) Provisional application No. 61/825,151, filed on May 20, 2013.

(51) Int. Cl.
*F16L 37/098* (2006.01)

(52) U.S. Cl.
CPC ....... *F16L 37/098* (2013.01); *Y10T 29/49826* (2015.01)

(58) Field of Classification Search
CPC .... F16L 37/0841; F16L 37/088; F16L 37/101
USPC ........................................................ 285/305
See application file for complete search history.

(56) References Cited

U.S. PATENT DOCUMENTS

| | | | | |
|---|---|---|---|---|
| 3,428,340 A * | 2/1969 | Pelton | ............... | F16L 37/088 |
| 4,640,534 A * | 2/1987 | Hoskins | ............... | F16L 37/088 |
| 4,991,880 A * | 2/1991 | Bernart | ............... | F16L 37/088 |
| | | | | 285/305 |
| 5,529,743 A | 6/1996 | Powell | ............... | 264/513 |
| 5,682,924 A | 11/1997 | Powell | ............... | 138/109 |
| 5,855,399 A * | 1/1999 | Profunser | ............... | F16L 37/088 |
| | | | | 285/305 |
| 6,041,824 A | 3/2000 | Powell | ............... | 138/109 |
| 6,102,450 A | 8/2000 | Harcourt | ............... | 285/401 |
| 6,110,412 A | 8/2000 | Anderson | ............... | 264/504 |
| 6,409,228 B1 | 6/2002 | Fadini et al. | ............... | 285/305 |
| 6,443,500 B1 | 9/2002 | Inoue et al. | ............... | 285/307 |
| 6,464,263 B1 | 10/2002 | Schwarz et al. | ............... | 285/305 |
| 6,494,502 B1 | 12/2002 | Plante | ............... | 285/373 |
| 6,508,491 B1 | 1/2003 | Ebinger et al. | ............... | 285/223 |
| 6,681,458 B2 * | 1/2004 | Seymour | ............... | H01R 13/6335 |
| | | | | 285/305 |

(Continued)

FOREIGN PATENT DOCUMENTS

| DE | EP 1635103 A1 * | 3/2006 | ............ F16L 37/088 |
|---|---|---|---|
| EP | 1 255 069 A1 | 11/2002 | ............ F16L 37/088 |

(Continued)

*Primary Examiner* — David E Bochna

(74) *Attorney, Agent, or Firm* — Renner Kenner Greive Bobak Taylor & Weber

(57) ABSTRACT

A clean air duct and retaining clip assembly for installation on a receiving port includes an assembly with a tubular body and a cuff extending from the tubular body. The cuff has a cuff groove, at least the cuff receivable on a receiving port, and a retaining clip only partially received in the cuff groove so as to secure the cuff and the tubular body to the receiving port. A clean air duct assembled to a receiving port is also disclosed. And a related method of assembling a clean air duct to a receiving port with a retaining clip is disclosed.

21 Claims, 16 Drawing Sheets

(56) References Cited

U.S. PATENT DOCUMENTS

| | | | |
|---|---|---|---|
| 6,808,211 B2 | 10/2004 | Hofmann et al. ............ 285/305 |
| 6,846,023 B2 | 1/2005 | Ebinger et al. .............. 285/420 |
| 6,991,270 B2 | 1/2006 | Ito et al. ..................... 285/403 |
| 6,997,486 B2 * | 2/2006 | Milhas .................. F16L 37/088 |
| | | | 285/305 |
| 7,128,347 B2 | 10/2006 | Kerin ........................... 285/305 |
| 7,201,403 B2 * | 4/2007 | Takayanagi ........... F16L 37/088 |
| | | | 285/305 |
| 7,325,841 B2 | 2/2008 | Vincent ........................ 285/305 |
| 7,338,093 B2 | 3/2008 | Bilstein et al. .............. 285/307 |
| 7,469,937 B2 * | 12/2008 | Iturgoyen Sabando ............ F16L 37/1225 |
| | | | 285/305 |
| 7,497,478 B2 | 3/2009 | Callahan ...................... 285/305 |
| 7,530,605 B2 * | 5/2009 | Rigollet ................ F16L 37/088 |
| | | | 285/305 |
| 7,562,910 B2 * | 7/2009 | Kertesz ................ F16L 37/088 |
| | | | 285/305 |
| 7,566,079 B1 | 7/2009 | Callahan et al. ............ 285/362 |
| 7,611,317 B2 | 11/2009 | Muderlak et al. ............ 411/522 |
| 7,618,070 B2 * | 11/2009 | Stoll ....................... F16L 47/02 |
| | | | 285/305 |
| 7,651,138 B2 | 1/2010 | Feger et al. ................. 285/319 |
| 7,690,694 B2 | 4/2010 | Poder ........................... 285/314 |
| 7,695,024 B2 | 4/2010 | Ostergren et al. ........... 285/308 |
| 7,828,338 B2 | 11/2010 | Kertesz et al. .............. 285/365 |
| 7,874,596 B2 | 1/2011 | Kertesz et al. .............. 285/417 |
| 7,971,911 B2 * | 7/2011 | Kertesz ................ F16L 37/088 |
| | | | 285/305 |
| 8,419,076 B2 * | 4/2013 | Keller .................. F16L 37/101 |
| | | | 285/305 |
| 8,857,398 B2 | 10/2014 | Schieszl ................... 123/184.21 |
| 9,004,543 B2 | 4/2015 | Bongiorni et al. ..... F16L 21/08 |
| 9,103,479 B2 | 8/2015 | Kertesz et al. ......... F16L 33/28 |
| 9,175,794 B2 | 11/2015 | Lewcun ................ F16L 37/113 |
| 9,283,344 B2 | 3/2016 | Sheffer et al. .... A61M 16/0816 |
| 9,383,050 B1 | 7/2016 | Home ..................... F16L 21/08 |
| 9,429,261 B2 | 8/2016 | Hess et al. ............. F16L 37/12 |
| 2001/0002754 A1 * | 6/2001 | Dobler ................. F16L 37/088 |
| 2004/0183301 A1 * | 9/2004 | Yoshida ............... F16L 37/088 |
| | | | 285/305 |
| 2006/0022460 A1 * | 2/2006 | Callahan .............. F16L 37/088 |
| | | | 285/305 |
| 2009/0102181 A1 | 4/2009 | Hartmann ...................... 285/26 |
| 2009/0218807 A1 | 9/2009 | Seryi ............................. 285/24 |
| 2010/0225108 A1 | 9/2010 | Mann ........................... 285/321 |
| 2011/0025042 A1 | 2/2011 | McNeil ........................... 285/39 |
| 2013/0140808 A1 * | 6/2013 | Bongiorni ............ F16L 37/088 |
| 2014/0070531 A1 | 3/2014 | Inoue et al. ............. F16L 21/08 |
| 2014/0167410 A1 | 6/2014 | Hess et al. ............. F16L 37/08 |
| 2014/0210202 A1 | 7/2014 | Hess et al. ............. F16L 21/08 |
| 2014/0326223 A1 | 11/2014 | Proettel et al. .. F02M 35/10209 |
| 2015/0076812 A1 | 3/2015 | Hess ..................... F16L 37/088 |
| 2015/0176740 A1 | 6/2015 | Ludwig ............... F16L 37/0982 |
| 2015/0226162 A1 | 8/2015 | Kohler ................... F16L 21/08 |
| 2015/0276108 A1 | 10/2015 | Ye et al. ............... F16L 37/088 |
| 2015/0345684 A1 | 12/2015 | Kujawski, Jr. ........ F16L 37/138 |

FOREIGN PATENT DOCUMENTS

| | | | | |
|---|---|---|---|---|
| FR | 28883952 A1 * | 10/2006 | ............ F17L 37/088 |
| FR | 2 854 675 | 12/2006 | ............ F16L 19/00 |
| GB | 2 392 481 | 10/2005 | ............ F16L 37/138 |
| JP | EP 1705417 A2 * | 9/2006 | ............ F16L 37/088 |
| JP | WO 2015141557 A1 * | 9/2015 | ............... F16B 7/04 |
| SE | WO 2007036794 A1 * | 4/2007 | ............ F16L 37/088 |
| WO | WO 2005/047752 A1 | 3/2005 | ............ F16L 37/088 |
| WO | WO 2016/169706 A1 | 10/2016 | ............... F16L 37/12 |

* cited by examiner

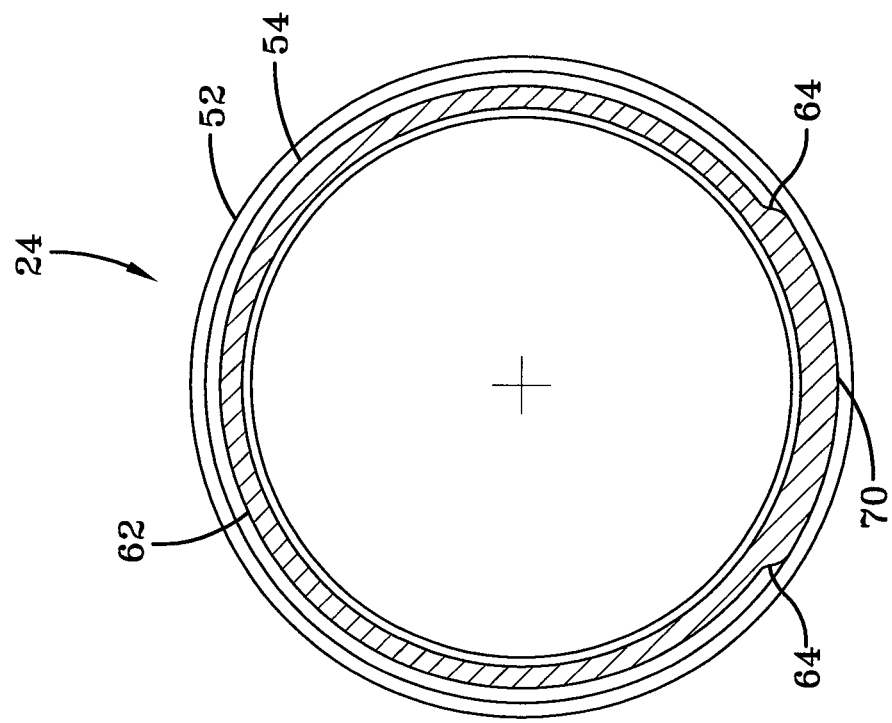
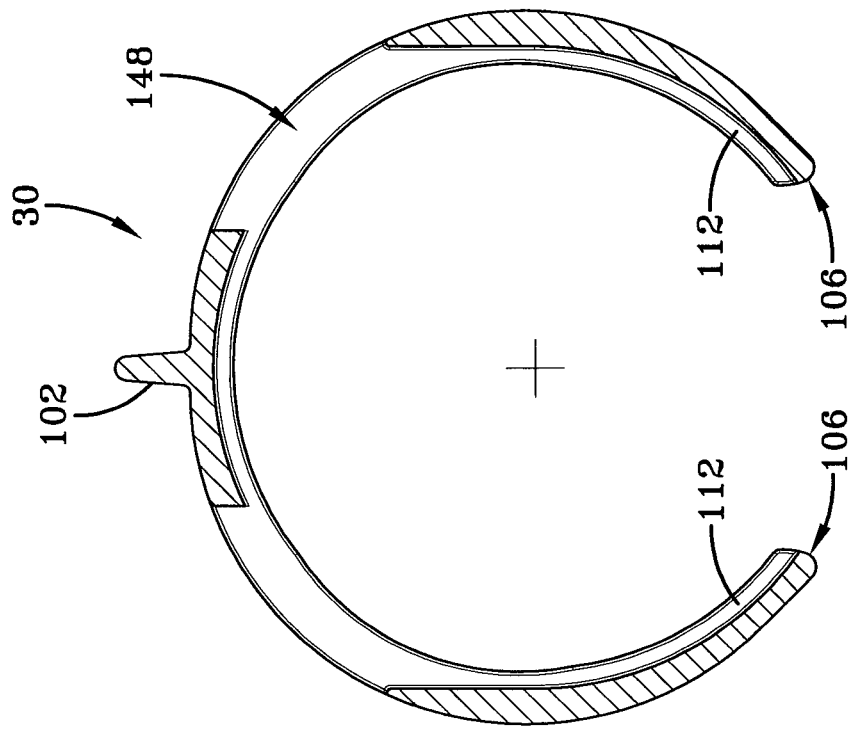

CLEAN AIR DUCT AND RETAINING CLIP AND ASSEMBLY THEREOF

CROSS-REFERENCE TO RELATED APPLICATIONS

This application claims priority of U.S. Provisional Application Ser. No. 61/825,151 filed May 20, 2013, which is incorporated herein by reference.

TECHNICAL FIELD

The present invention relates in general to an automotive clean air duct used to interconnect an automobile engine throttle body to an air filter. More particularly, the present invention relates to a clean air duct with a cuff that is positioned on a receiving port, wherein the cuff is attached to the receiving port with a deflectable clip. Specifically, the cuff includes a flexible fin that seals around the port when the deflectable clip and cuff are installed on the receiving port.

BACKGROUND ART

Air ducts of various lengths and sizes are used to transfer clean, filtered air from an air filter through an engine air intake system. It is also well known to use air ducts to transfer cooled or heated air from within the engine compartment to the passenger compartment of an automobile. Air ducts are widely used in other applications wherever air or any other gas-like substance is transferred between components.

Air ducts have been formed by using a rubber molding process. Although the rubber molded air ducts are effective, they are considered too heavy for use in vehicles requiring lighter weight to improve fuel efficiency. Additionally, rubber molded air ducts are bulky and difficult to mold in the serpentine configurations desired for automobiles which have limited space in the engine compartment.

An alternative to using a one-piece rubber molded air duct is a two-piece construction which utilizes a thermoplastic blow molded tubular body with an injection molded rubber cuff, sometimes called a seal, affixed to an end thereof. Although such a construction works better than the rubber molded ducts, both constructions rely on a hose clamp to circumferentially secure the cuff to a receiving port. Hose clamps are usually constructed from a metal band with a tightening screw wherein the screw is tightened so as to completely secure the duct to the receiving port. Specifically, the clamp is placed around the area where the cuff and receiving duct overlap. The clamp is then tightened to prevent air leakage or entry of dirt into the duct and also prevents the two components from separating during operation of the vehicle. Skilled artisans will appreciate that such a configuration has several drawbacks. First, it is time consuming to assemble the hose clamp, as it requires use of at least a screwdriver or other appropriate tool. Additionally, over-tightening of the clamp and engine vibration may cause the metal band to cut into the cuff which results in cuff tears and eventual leakage or openings in the cuff. Additionally, the metal may corrode over time and ultimately fail, thus rendering the sealed connection broken. Accordingly, there is a need in the art for a clean air duct with a cuff that utilizes a clip that replaces the hose clamp and which provides a more reliable seal and wherein the air duct and cuff are installed without any tools so as to result in a cost savings in the overall assembly and the assembly process.

DISCLOSURE OF THE INVENTION

It is therefore an object of the present invention to provide a clean air duct and retaining clip and assembly thereof.

It is another object of the present invention to provide a clean air duct and retaining clip assembly for installation on a receiving port, the assembly comprising a tubular body, a cuff extending from the tubular body, the cuff having a cuff groove, at least the cuff receivable on the receiving port, and a retaining clip only partially received in the cuff groove so as to secure the cuff and the tubular body to the receiving port.

Still another object of the present invention is to provide a method of assembling a clean air duct to a receiving port with a retaining clip, comprising providing a tubular body with a cuff extending from the tubular body, the cuff having a cuff groove, the cuff also having an interior surface with at least one angular surface, providing a retaining clip which is at least partially received in the cuff groove, positioning the tubular body and the retaining clip on to a receiving port which has an external surface with at least one mating angular surface that is positioned to be adjacent the at least one angular surface, and deflecting the retaining clip so as to allow the at least one mating angular surface and the adjacent at least one angular surface to come into sealing contact with one another.

Yet another object of the present invention is to provide a clean air duct assembled to a receiving port with a retaining clip, comprising a receiving port having an annular ridge, a tubular body, a cuff extending from the tubular body, the tubular body having an exterior cuff groove and the cuff having a cuff rim adjacent the exterior cuff groove, and a retaining clip having a retention wall and a cuff wall which form a rim groove therebetween, wherein the rim groove captures the annular ridge and the cuff rim so as to secure the tubular body and the cuff to the receiving port.

BRIEF DESCRIPTION OF THE DRAWINGS

These and other features and advantages of the present invention will become better understood with regard to the following description, appended claims, and accompanying drawings. Further, in the accompanying drawings and description that follow, like parts are indicated throughout the drawings and written description with the same reference numerals, respectively. The figures may or may not be drawn to scale and proportions of certain parts may be exaggerated for convenience of illustration.

FIG. 19A is a cross-sectional view of the clip according to the concepts of the present invention;

FIG. 19B is a cross-sectional view of the according to the concepts of the present invention;

BEST MODE FOR CARRYING OUT THE INVENTION

Figure 1:
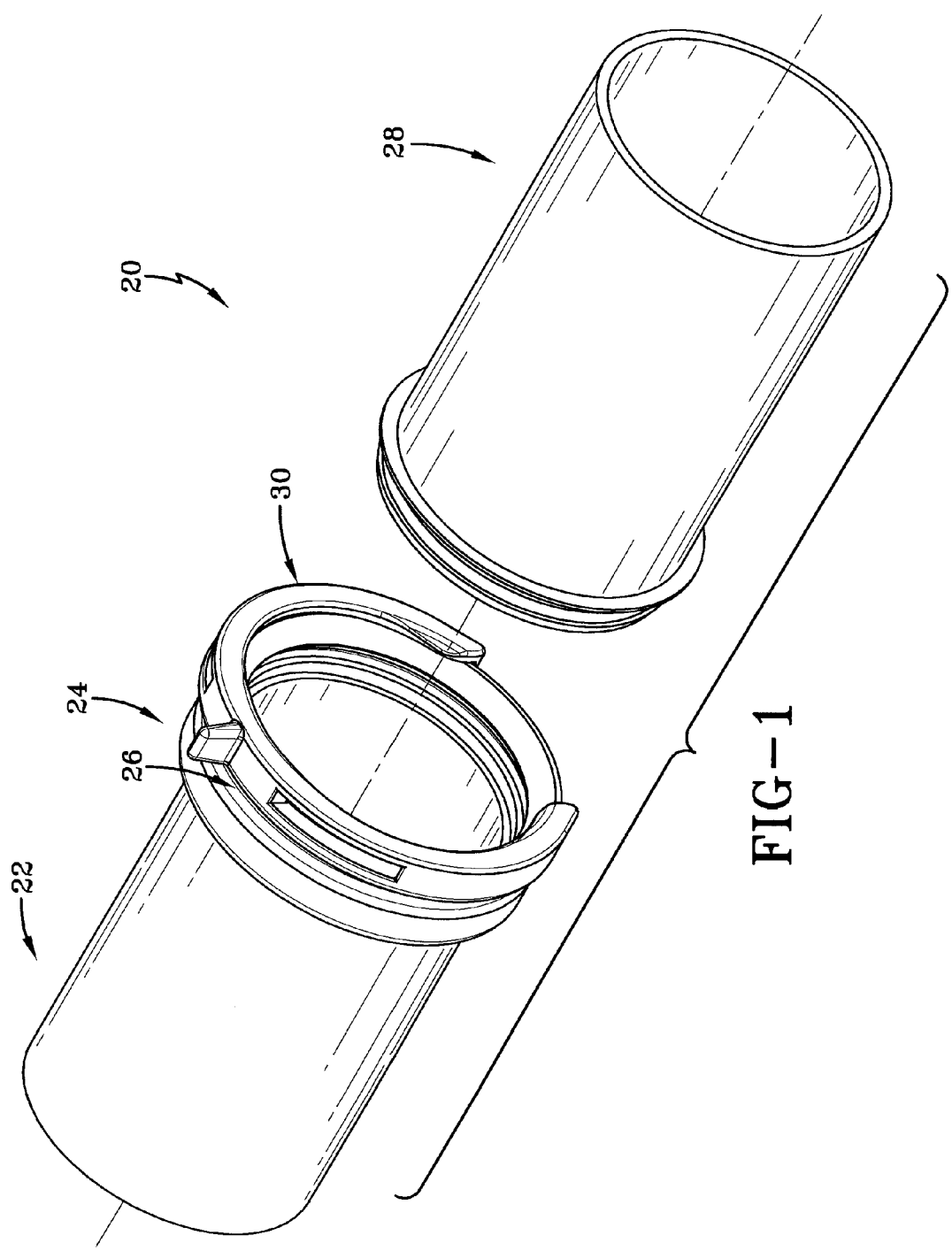
FIG. 1 is a perspective view of a clean air duct and retaining clip assembly made in accordance with the concepts of the present invention.

With reference to the drawings, and in particular to FIG. 1, it can be seen that a clean air duct and retaining clip assembly is designated generally by the numeral 20. The assembly 20 is receivable and/or mounted onto a port such as an air filter, engine compartment, a throttle body, or other similar structure. Although the assembly disclosed herein is used in automobile engine compartments, skilled artisans will appreciate that the duct and associated assembly disclosed herein may be utilized in any environment where air or a gas needs to be transferred from one compartment to another and in such a way so as to seal the duct from external contaminants.

Generally, the assembly 20 comprises a tubular body 22 which has a cuff 24 secured to and around an end of the tubular body 22. The cuff 24 provides an exterior groove 26 about its outer circumference. The tubular body and the cuff, which may be referred to as an air duct or sub-assembly, are assembled onto a receiving port 28. A clip 30, which may be pre-installed on the cuff or installed after the cuff is assembled to the receiving port, secures the air duct to the receiving port so as to provide a secure and air-tight connection therebetween.

Figure 2:
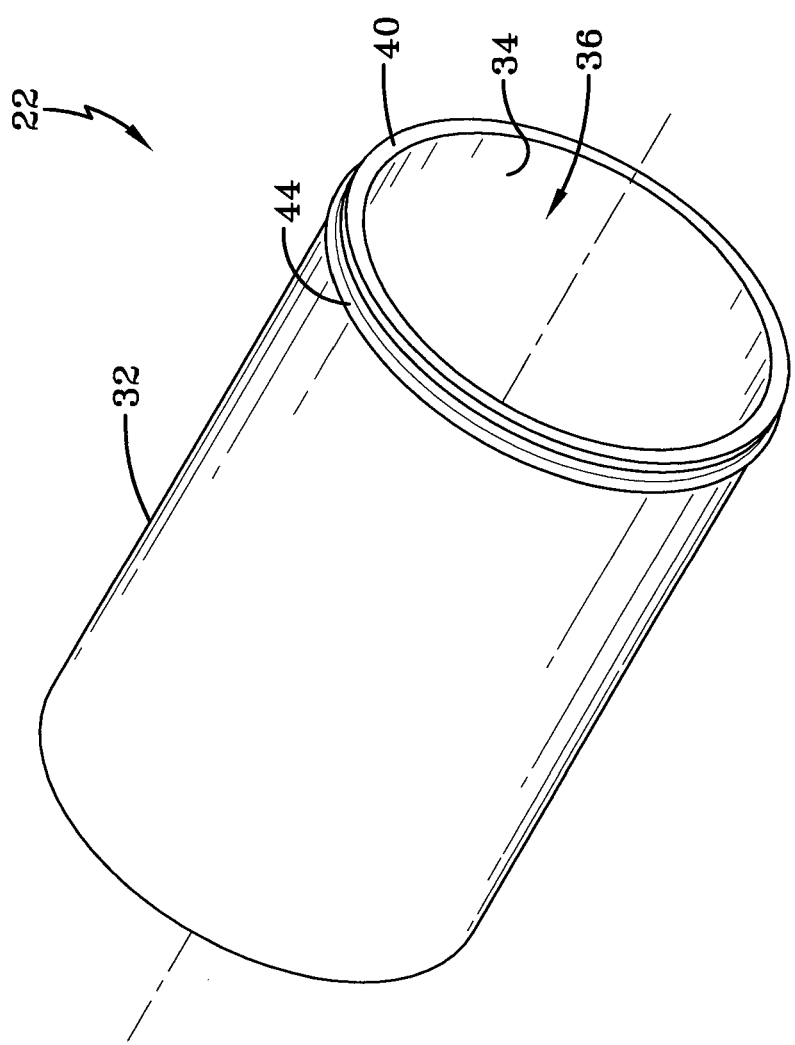
FIG. 2 is a perspective view of a tubular body utilized in the assembly according to the concepts of the present invention.
Figure 3:
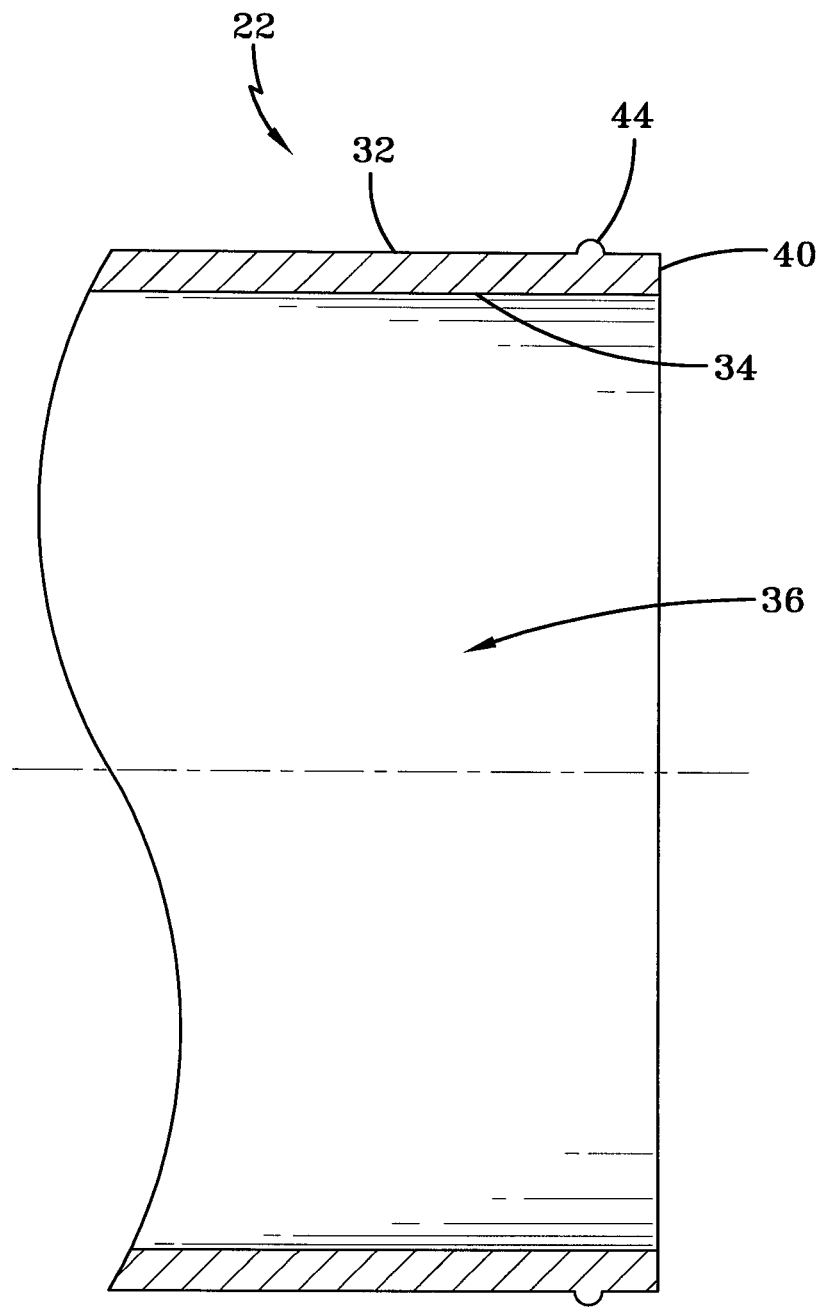
FIG. 3 is a cross-sectional view of the tubular body.
Figure 4:
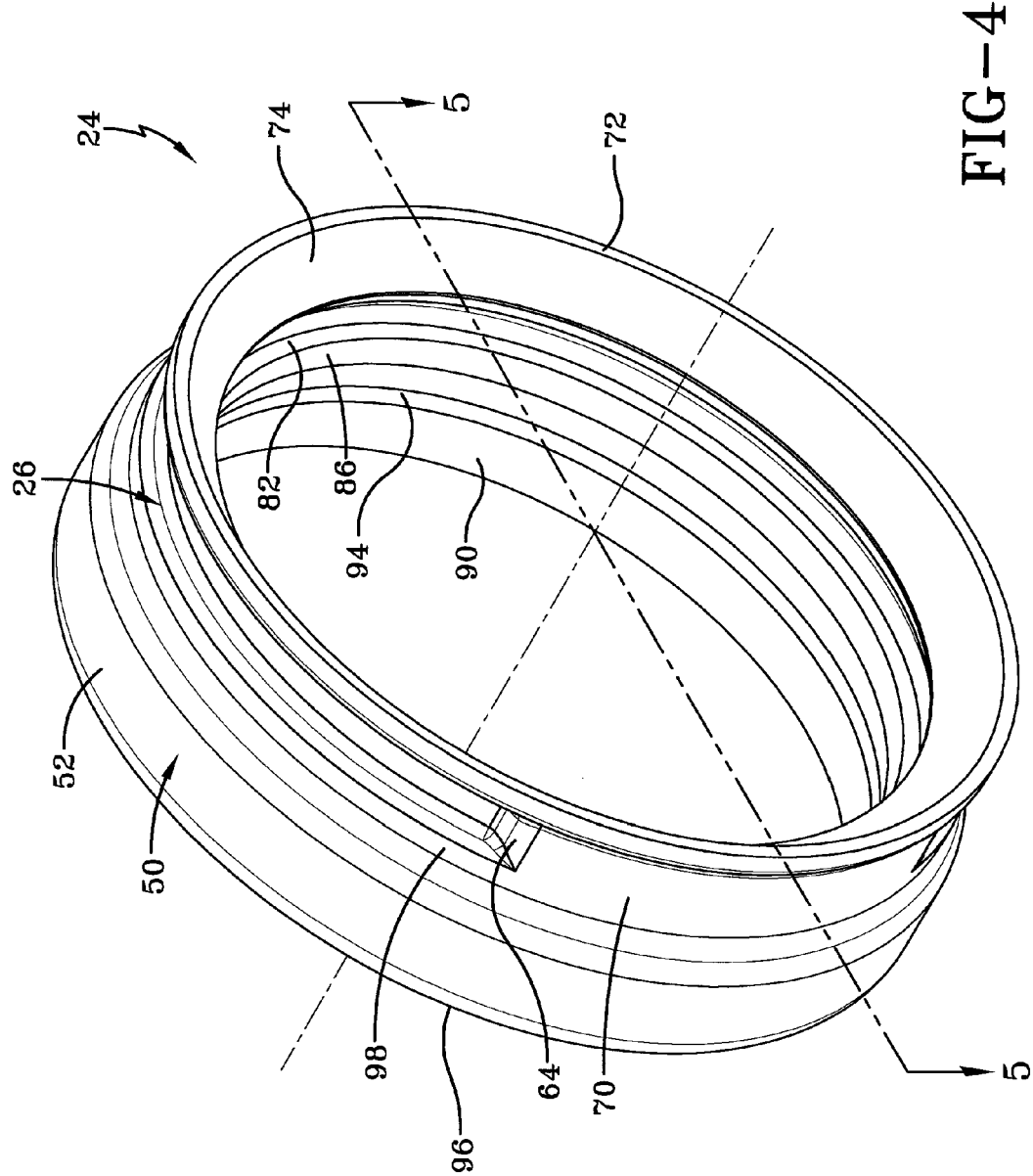
FIG. 4 is a perspective view of a cuff utilized in the assembly according to the concepts of the present invention.
Figure 6:
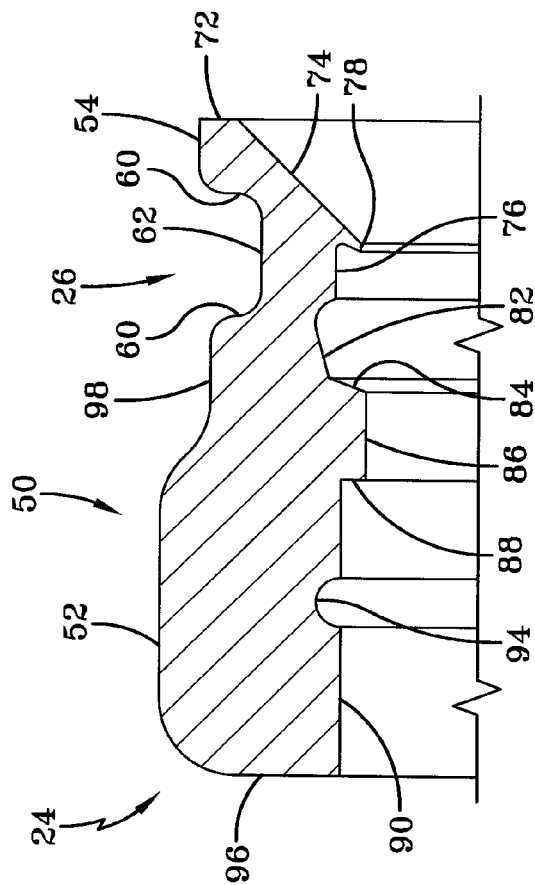
FIG. 6 is an enlarged cross-sectional view of the cuff according to the concepts of the present invention.

Referring now to FIGS. 2 and 3, it can be seen that the tubular body 22 includes an exterior surface 32 opposite an interior surface 34. The interior surface forms a body interior 36 which provides the opening or void to allow for transfer of air or other gaseous materials between the ends of the tubular body. A cuff end 40 interconnects the exterior surface 32 and the interior surface 34. In one embodiment, an annular ring 44, which may be slightly removed or positioned away from the cuff end 40, is disposed around the exterior surface 34. The annular ring 44 may be rounded or of a square configuration. In an alternative embodiment, the tubular body 22 may be provided with an inwardly extending lip as disclosed and shown in U.S. Pat. No. 5,682,924, which is incorporated herein by reference.

The tubular body 22, in most embodiments, is manufactured utilizing a blow-molding process. In some embodiments, the body may be configured by extrusion or injection molding. The tubular body may be made from a polymeric material such as polypropylene manufactured by Lyondell Bassel under port number Pro-Fax™ SV 152 which has a hardness value of 78 Shore D. Skilled artisans will appreciate that other polymeric materials having similar properties and values may also be utilized. Other suitable materials that could be used for the tubular body 22 are: nylon manufactured by BASF under the part number Ultrmid™ 827G which has a hardness value of 121 Shore R; nylon 6/6 manufactured by DuPont under part number Zytel™ BM70G20HSLX which has a hardness value of 120 Shore R; or thermoplastic elastomer manufactured by Teknor Apex under part number Sarlink™ 4190B which has a hardness value of 90 Shore A. Accordingly, in some embodiments the material used for the tubular body 22 may have a hardness value ranging anywhere from about 70 Shore A to about 130 Shore R, and in other embodiments from about 90 Shore A to about 121 Shore R.

Referring now to FIGS. 4-7, it can be seen that the cuff is designated generally by the numeral 24. Generally, the cuff 24 comprises a cuff body 50 which may be molded to or otherwise secured to the tubular body 22. The cuff body is constructed of a polymeric material and, in particular, a polymeric material which, in most embodiments, is relatively softer than the polymeric material utilized for the tubular body. In most embodiments, the cuff may be made from thermoplastic elastomer which is manufactured by RTP Company under part number RTP™ 6091-65 which has a hardness value of 65 Shore A. Other polymeric materials having similar properties and values may be utilized. Other suitable materials that could be used for the cuff are: thermoplastic elastomers manufactured by Exxon Mobile part number Satoprene™ 101-55, which has a hardness value of 55 Shore A, or Santoprene™ 101-64 which has a hardness value of 64 Shore A. Other suitable thermoplastic elastomers are manufactured by Teknor Apex under part numbers Sarlink 4175B, which has a hardness value of 75 Shore A, or Sarlink 4180B which has a hardness value of 80 Shore A. The RTP Company also manufactures thermoplastic elastomers RTP™ 6091-65, which has a hardness value of 65 Shore A, and RTP 6091-85, which has a hardness value of 85 Shore A. A liquid silicone rubber material manufactured by Wacker Chemical under part number LR 3070/60 which has a hardness value of 60 Shore A may also be utilized. Accordingly, in some embodiments, the material used for the cuff may have a hardness value ranging anywhere from about 45 Shore A to about 90 Shore A, and in other embodiments from about 55 Shore A to about 80 Shore A.

Figure 7:
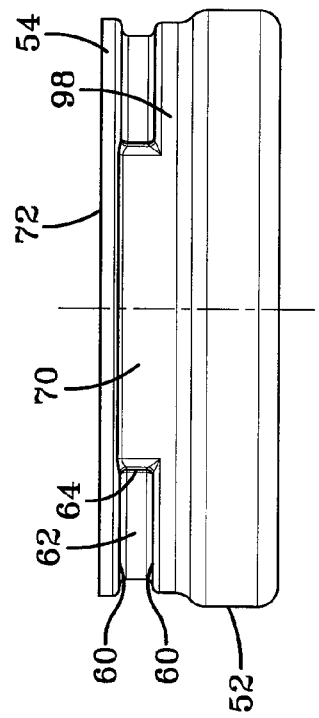
FIG. 7 is a bottom view of the cuff showing a particular feature according to the concepts of the present invention.
Figure 5:
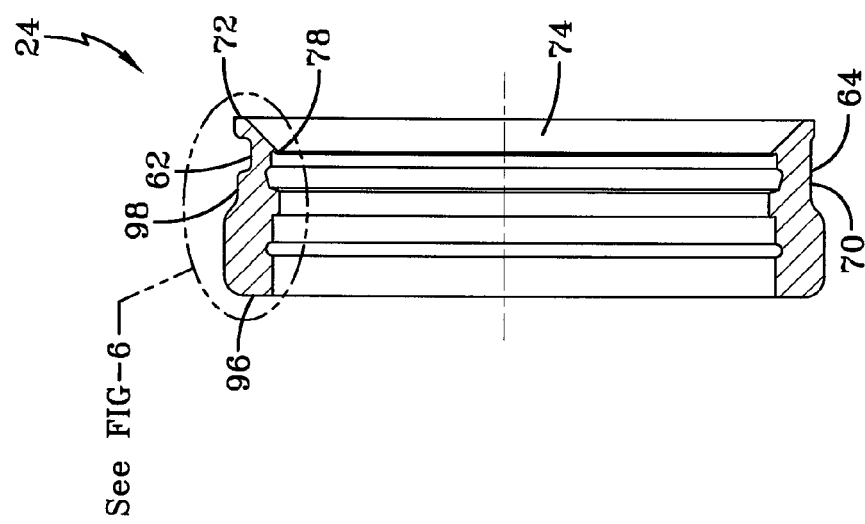
FIG. 5 is a cross-sectional view of the cuff according to the concepts of the present invention.

The cuff body 50 provides a cuff body surface 52 which is the substantive portion of the outer surface of the cuff body 50. At one end of the cuff body surface is a cuff rim 54, wherein the cuff groove 26 is disposed between the cuff rim 54 and the cuff body surface 52. The cuff groove 26 includes a pair of opposed sidewalls 60 which are connected to one another by a cuff surface 62. As will become apparent as the description proceeds, the retaining clip 24 is receiving in the cuff groove 26 and disposed about and on the cuff surface 62 and the cuff rim 54. The cuff groove 26, as best seen in FIG. 7, may be terminated circumferentially at a pair of groove endwalls 64 that are substantially perpendicular with the groove sidewalls 60. It will further be appreciated that in some embodiments the groove endwalls 64 are tapered. In other words, the endwalls 64 angularly extend from the cuff surface 62 to a clip expansion surface 70. The relevance of the groove endwalls 64 and the clip expansion surface 70 will be explained as the description proceeds.

The cuff rim 54 provides a rim end surface 72 which is substantially perpendicular thereto. Further extending from the rim end surface 52 is a chamfer 74 which may be angularly extended from the end surface 72. The chamfer 74 provides a transitional surface so as to assist in positioning the cuff 24 onto the receiving port 28. Angularly extending from the chamfer 74 is a port surface 76 which may be substantially parallel with the cuff surface 62. Moreover, in one embodiment, the port surface 76 may be sized so as to provide a frictional fit about the receiving port 28. Disposed between the chamfer 74 and the port surface 76 may be at least one fin-like wiper 78. The wiper 78, which may angularly project at about the same angle as the chamfer 74, extends radially inward so as to provide a seal about the receiving port 28 when the cuff 24 is installed thereon. In some embodiments, more than one wiper 78 may be provided. It will further be appreciated that the wiper 78 is disposed on the interior side of the cuff opposite the cuff surface 62. As a result, when the retaining clip is installed, an additional compressive force may be applied about the area where the wiper 78 is provided.

Extending from the port surface 76 is a radial channel 82. Further extending from an opposite edge of the radial channel 82 is a ramp surface 84. Extending from an opposite edge of the ramp surface 84 is a gap surface 86 which may be substantially parallel with the cuff body surface 52. Extending substantially perpendicularly from an opposite edge of the gap surface 86 is a body stop surface 88. Extending substantially perpendicularly from the stop surface 88 is a cuff interior surface 90. In some embodiments, a cuff channel 94 which extends radially outward from the interior surface 90 may be provided. Skilled artisans will appreciate that the cuff channel 94, the body stop surface 88, the gap surface 86, the ramp surface 84, the channel 82, the wiper 78, the port surface 76 and the chamfer 74 form the entirety of the interior of the cuff body 50. In other words, these surfaces are inwardly disposed from the cuff and are either secured to the tubular body 22 or are configured to be received on the receiving port 28 as will become apparent.

Extending substantially perpendicularly from the cuff interior surface 90 is a cuff end surface 96 which may transition perpendicularly to the cuff body surface 52. The transition between the cuff end surface 96 may be rounded as shown or may be perpendicular.

Laterally disposed between the outer diameter of the cuff body surface 52 and the cuff groove 26 is a cuff expansion ring 98. In other words, the cuff expansion ring 98 is that surface between the adjacent cuff groove sidewall 60 and the cuff body surface 52. Moreover, the cuff expansion ring 98 may be contiguous with the clip expansion surface 70. In other words, the clip expansion surface 70 and the cuff expansion ring 98 are aligned with one another and are of substantially the same outer diameter.

Figure 8:
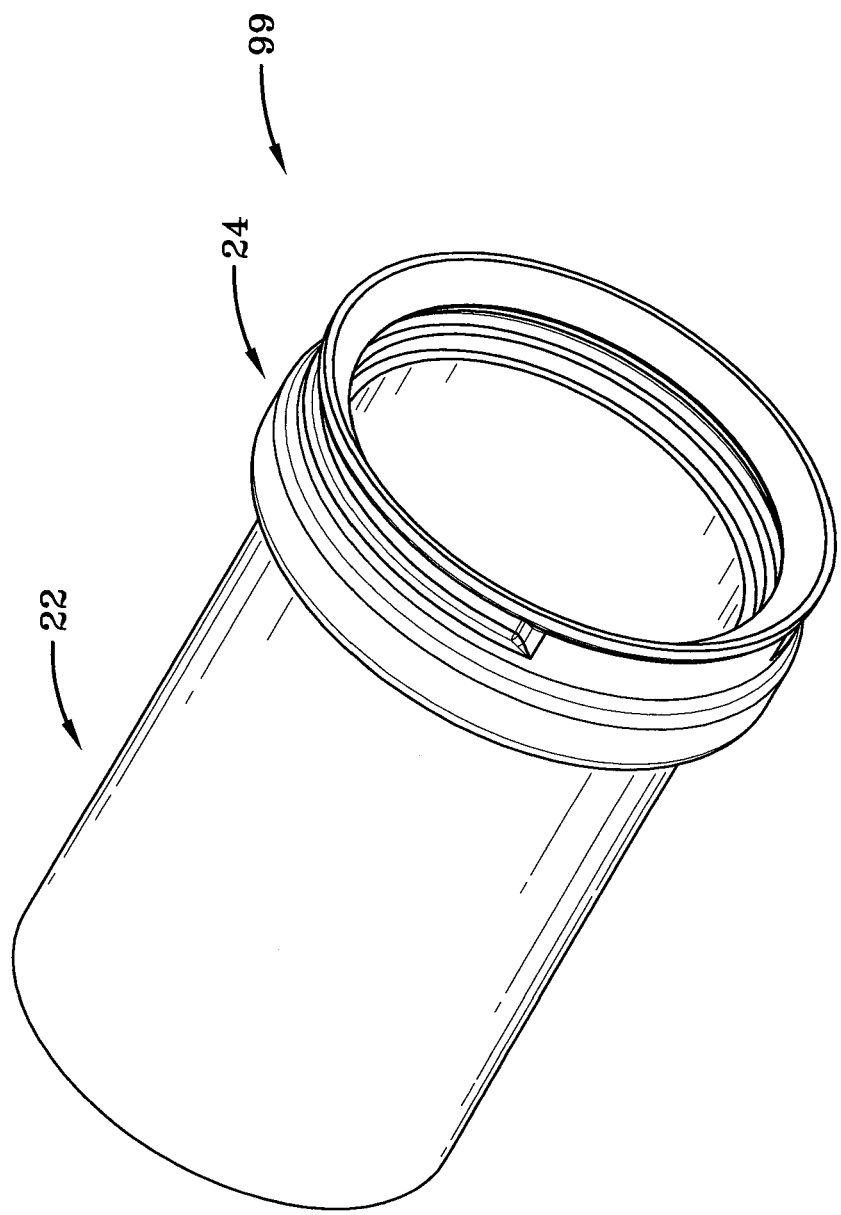
FIG. 8 is a perspective view of a sub-assembly showing the tubular body and the cuff according to the concepts of the present invention.
Figure 9:
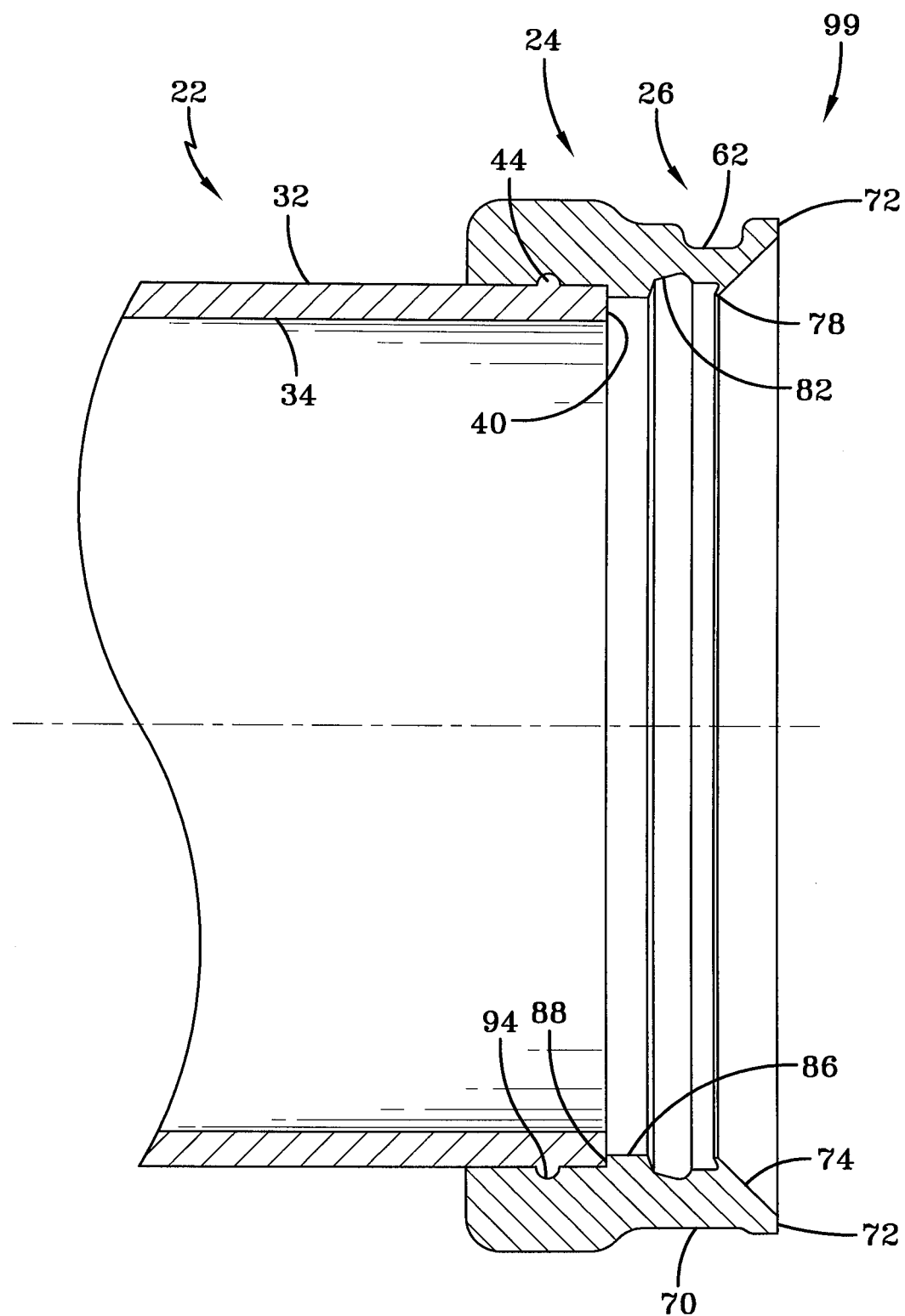
FIG. 9 is an enlarged cross-sectional view of the sub-assembly according to the concepts of the present invention.
Figure 10:
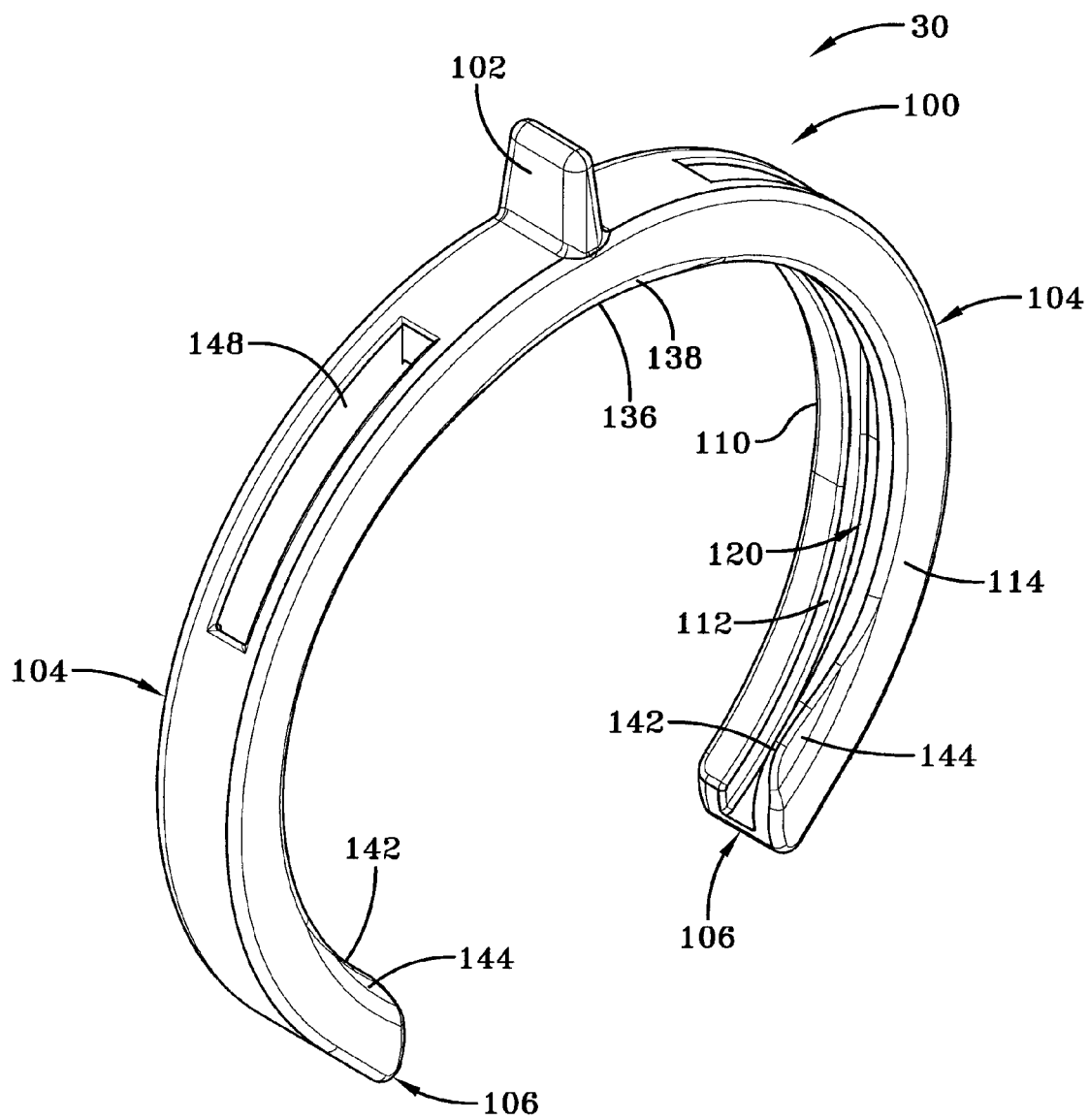
FIG. 10 is a front perspective view of a retaining clip utilized with the assembly according to the concepts of the present invention.
Figure 11:
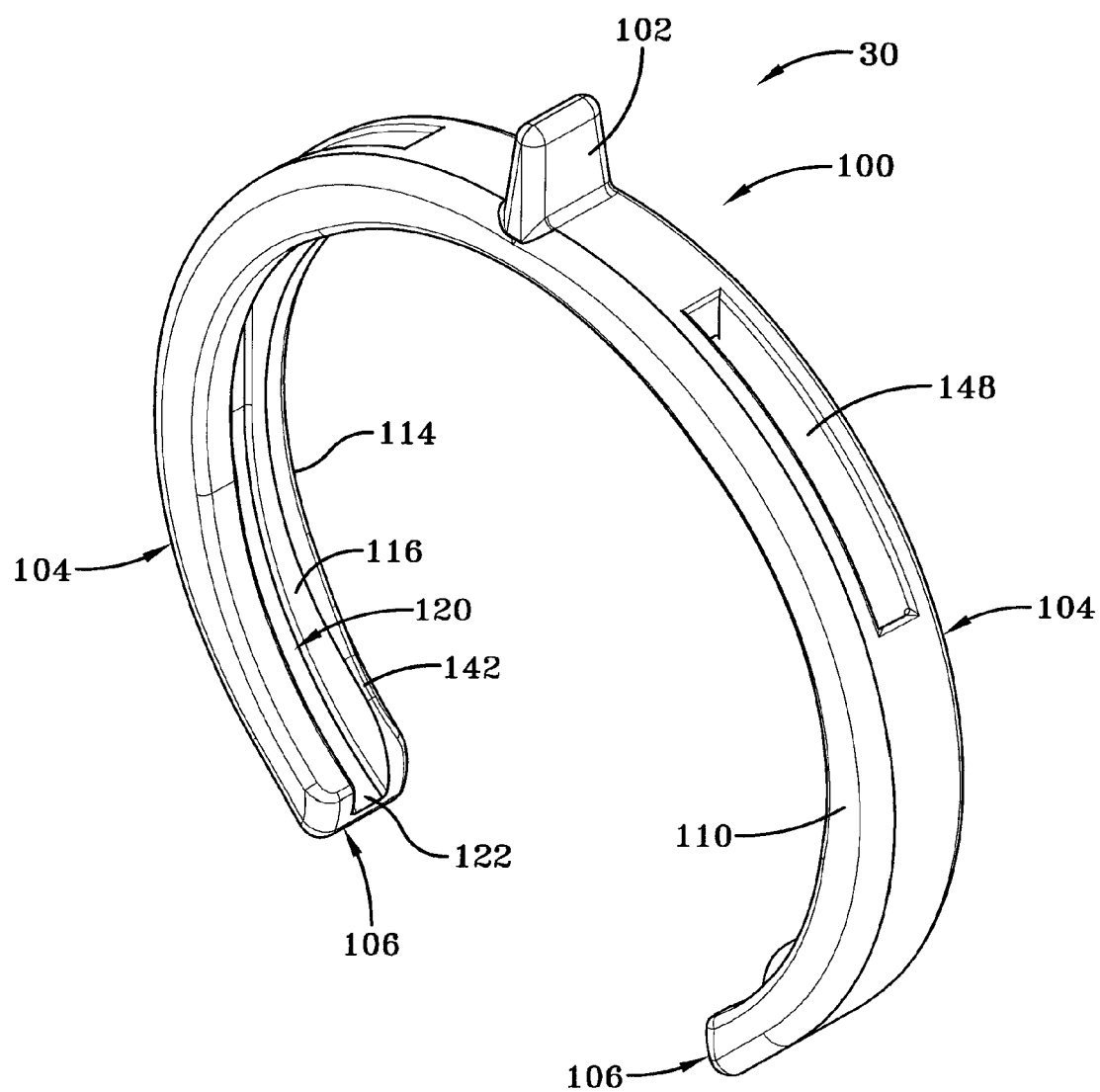
FIG. 11 is a rear perspective view of the retaining clip according to the concepts of the present invention.
Figure 12:
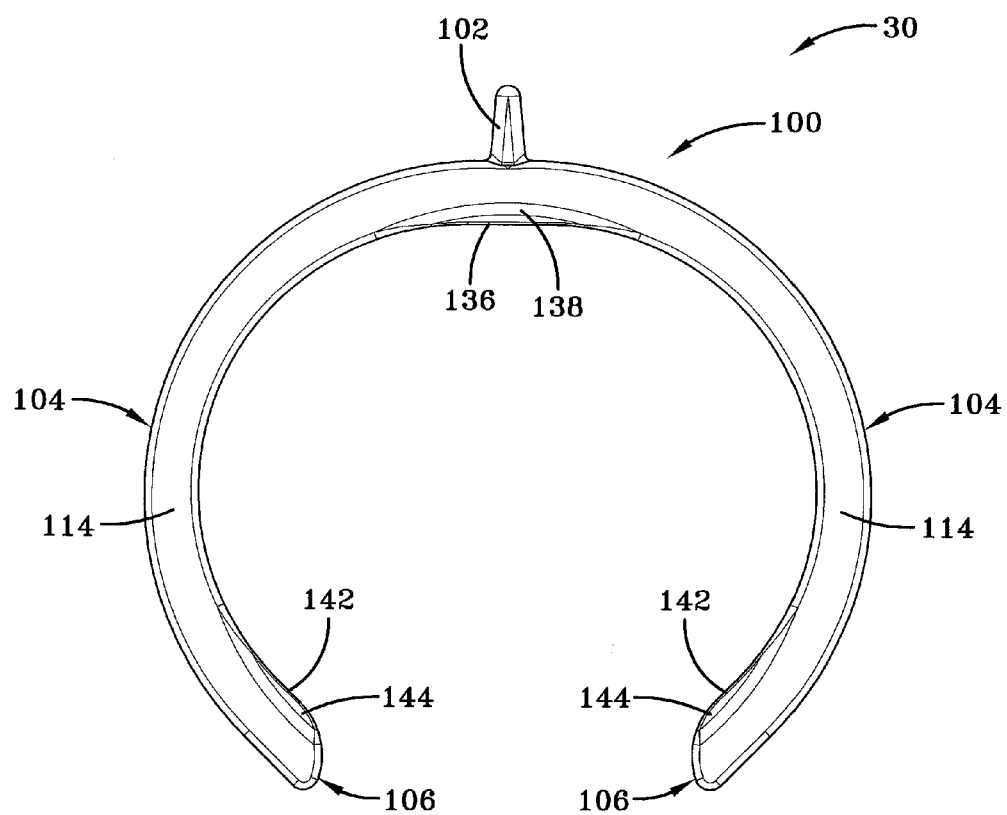
FIG. 12 is a front elevational view of the clip according to the concepts of the present invention.
Figure 13:
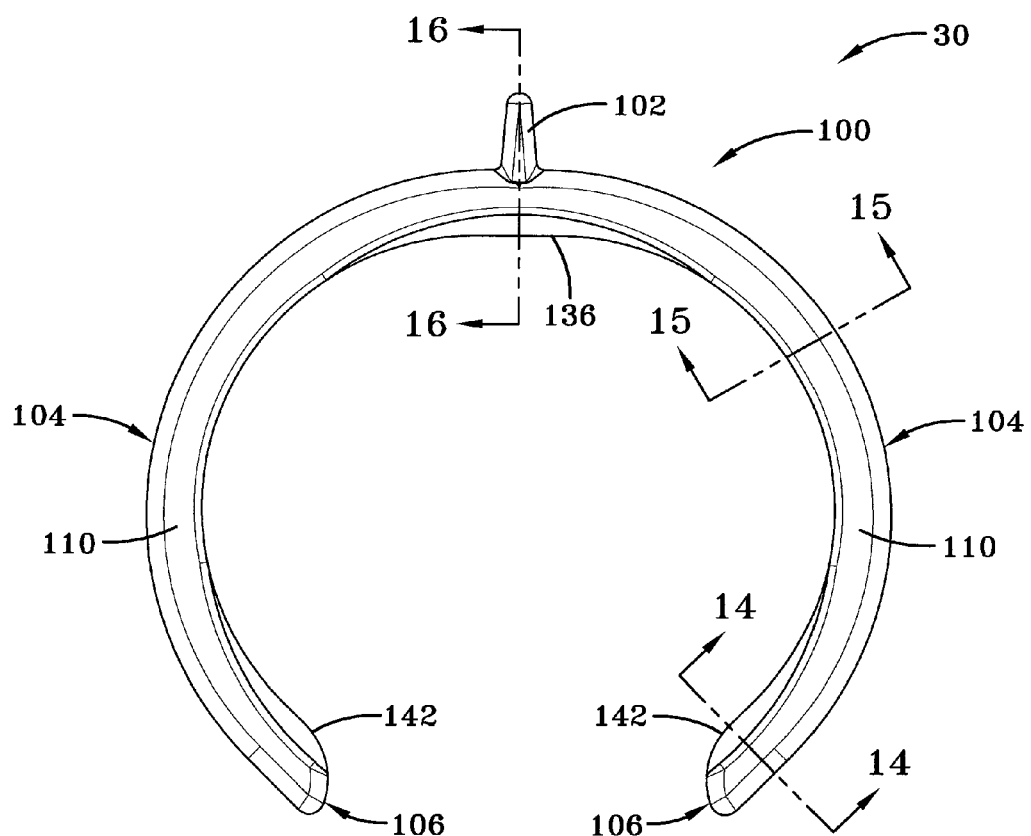
FIG. 13 is a rear elevational view of the clip according to the concepts of the present invention.
Figure 14:
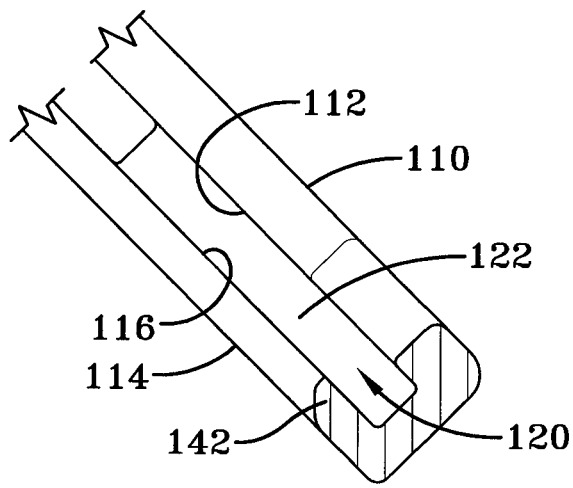
FIG. 14 is a cross-sectional view of the clip taken along lines 14-14 of FIG. 13 according to the concepts of the present invention.
Figure 15:
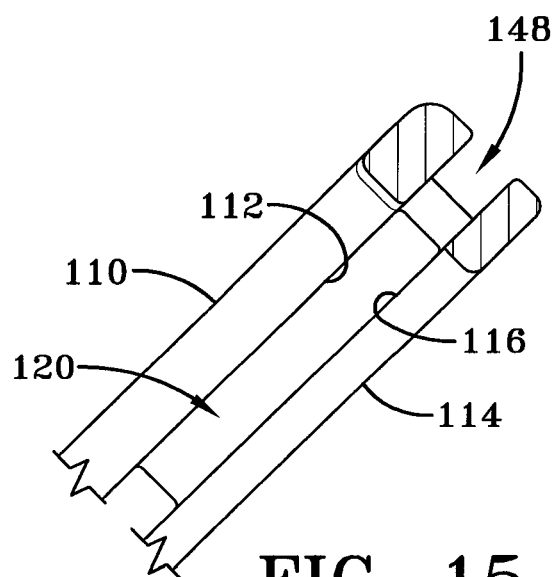
FIG. 15 is a cross-sectional view of the clip taken along lines 15-15 of FIG. 13 according to the concepts of the present invention.
Figure 16:
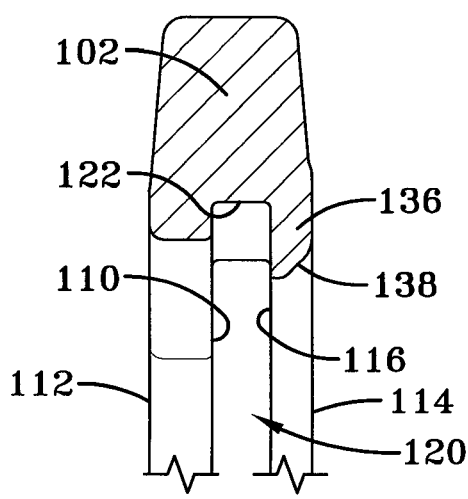
FIG. 16 is a cross-sectional view of the clip taken along lines 16-16 of FIG. 13 according to the concepts of the present invention.

Referring now to FIGS. 8 and 9, it can be seen that a sub-assembly is designated generally by the numeral 99. The sub-assembly is, in most embodiments, formed by placing the tubular body into a cuff body injection mold, wherein the tubular body 22 is inserted onto a core or mandrel or otherwise received in an injection mold whereupon the material utilized to form the cuff is injected into the mold about the end of the tubular body so as to form the cuff 24. As a result, the tubular body 22 is chemically and mechanically secured to the cuff 24. As best seen in FIG. 9, the annular ring 44 of the tubular body 22 may be received in the cuff channel 94. Moreover, the cuff end 40 may abut and may be positioned substantially adjacent to the body stop surface 88.

In the embodiment shown, the cuff body is formed by an injection molding process over-molded to the tubular body 22. However, skilled artisans will appreciate that other manufacturing procedures could be utilized to secure the cuff to the tubular body. These other procedures may include, but are not limited to mechanical or adhesive attachments, spin-welding, or other heat securement processes. However, it is believed that the injection molding process provides both cost and structural benefits over the other aforementioned processes.

Referring now to FIGS. 10-16, it can be seen that the retaining clip is designated generally by the numeral 30. Briefly, the retaining clip 30 is utilized to secure the sub-assembly 99 to the receiving port 28. In one embodiment, the retaining clip 30 is pre-installed onto the sub-assembly 99. By virtue of the structural configuration of the clip 30, which will be described in detail, the clip pre-assembled to the sub-assembly 99 may be axially installed onto the receiving port 28. In the alternative, the sub-assembly 99 may be installed onto the receiving port 28 and then the clip 30 is installed. In either scenario, the clip 30 functions to retain the sub-assembly onto the receiving port. If it is desired to remove the sub-assembly from the receiving port, the clip 30 may be removed. The clip may be removed by radially pulling on the clip or by rotating the clip so as to disengage it from the exterior groove 26. Details of the assembly and dis-assembly processes will be discussed in further detail.

The clip 30 provides a clip body 100 which may be constructed of a polymeric material. In some embodiments the material used to form the clip body 100 may be the same as utilized to form the tubular body 22. Other materials that may be used for the clip body include, but are not limited to, BASF Ultramid 8202, which has hardness value of 121 Shore R; Lyondell Bessel Pro-Fax SB891, which has a hardness value of 78 Shore D; and DuPont Zytel 80G14AHS which has a hardness value of 120 Shore R. Accordingly, in some embodiments the material used for the clip 30 may have a hardness value ranging anywhere from about 70 Shore A to about 130 Shore R, and in other embodiments from about 90 Shore A to about 121 Shore R. The clip body, which is C-shaped, provides for a centrally disposed and outwardly radially extending tab 102. As shown in the drawings, the tab 102 is substantially perpendicular with the body 100, but may be angularly orientated in other embodiments. Extending from both sides of the tab 102 are a pair of arcuate fingers 104. These arcuate fingers 104 form the C-shape. It will be appreciated that each of the arcuate fingers 104 provide a tip 106 at a distal end. The tips 106 may form an angular opening that in one embodiment is somewhere between 30° and 45°. Skilled artisans will appreciate that the opening could be as large as 175° and as small as 25°. The angular opening may be dependent upon the material utilized in the formation of the clip, the size of the cuff upon which the clip will be received, and other factors.

Each arcuate finger 104 includes a cuff wall 110 that extends from the clip body 100 where in the cuff wall 110 provides a wall surface 112. Spaced apart from the cuff wall 110 is a retention wall 114 which also extends from the clip body 100. The walls 110 and 114 may extend in the same direction from the clip body and the retention wall 114 provides a wall surface 116 that faces the wall surface 112. Formed between the walls 110 and 112 is a rim groove 120 which provides for a groove wall surface 122 that connects and is substantially perpendicular to both the wall surface 112 and the wall surface 116.

The cuff wall surface 112 provides an inner diameter which is essentially circular, although a slight non-circular shape may be utilized. Indeed, the inner diameter is sized so as to match the diameter of the cuff groove upon which the clip is received. The retention wall 116 also provides for an inner diameter which also may be of a circular configuration, but which also may be provided in a slightly non-circular shape.

The retention wall 114 provides for a central protuberance 136 which is substantially opposite the tab 102. The protuberance 136 extends inwardly radially from the wall surface 116. The protuberance 136 may provide for a central chamfer 138. Each tip 106 includes an end protuberance 142 which extends radially inward from the respective retention wall 114. Each end protuberance 142 may provide for an end chamfer 144. In some embodiments, the arcuate fingers 104 may provide a body slot 148. The body slot 148 is substantially between the cuff wall surface 112 and the retention wall surface 116 and radially positioned somewhere between the tab 102 and the respective tips 106. The body slot is ostensibly provided for allowing the manufacturer to form the clip in an injection mold; however, the configuration of the body slot may contribute to the spring force exerted by the clip. In other words, by adjusting the length of each slot 142, either more or less spring force can be obtained for the clip.

Figure 17:
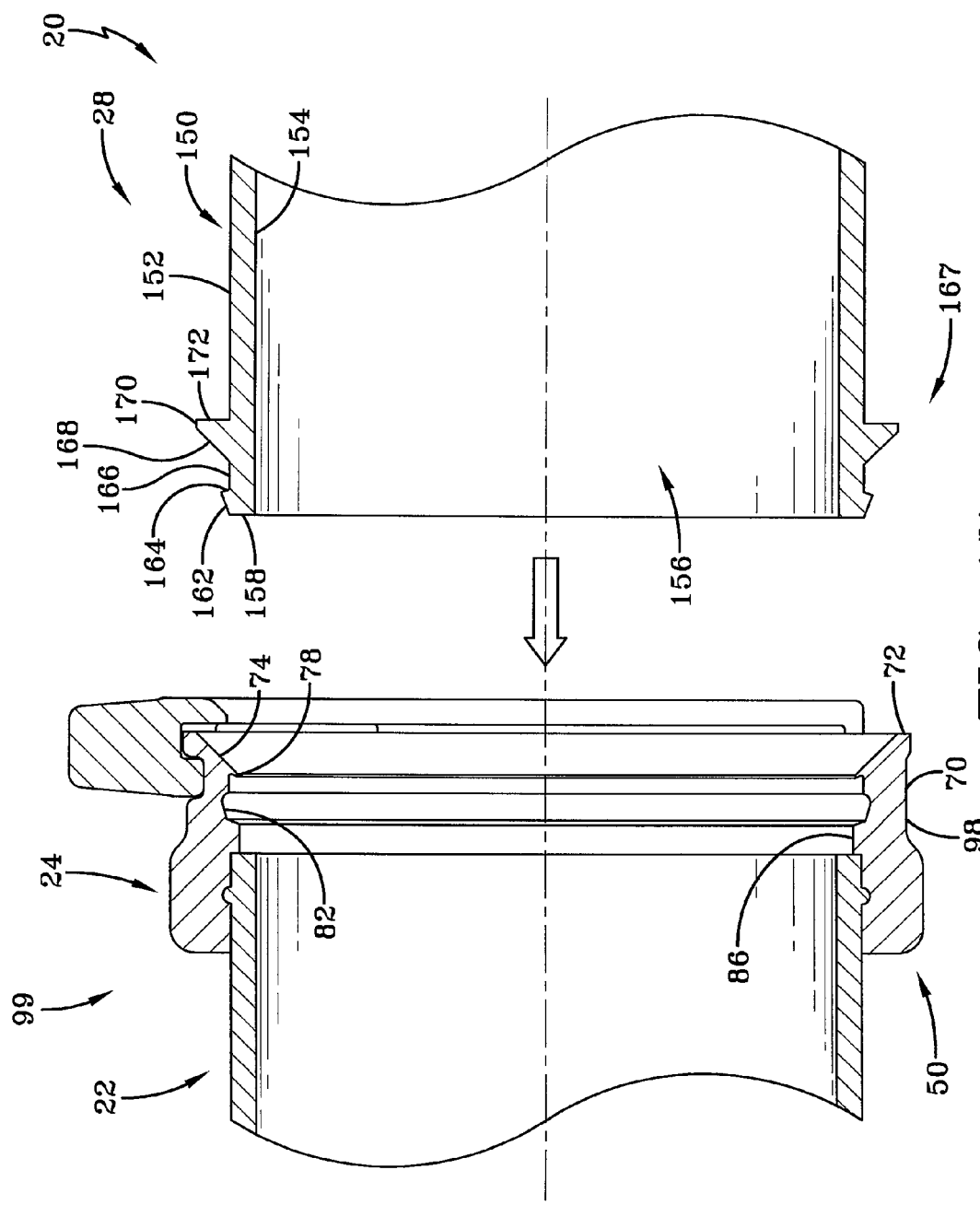
FIG. 17 is an exploded view of the sub-assembly and a receiving port upon which the sub-assembly is assembled according to the concepts of the present invention.
Figure 18:
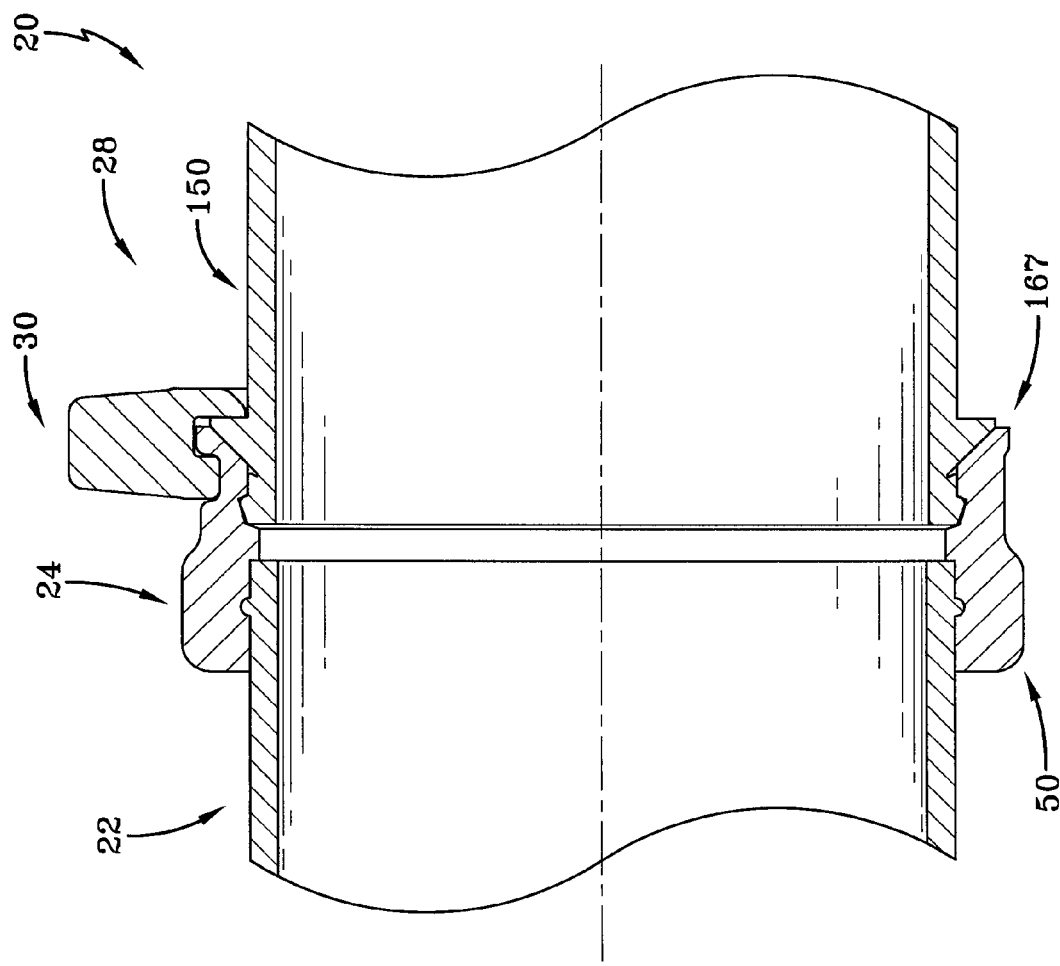
FIG. 18 is a cross-sectional view of the sub-assembly, the receiving port and the retaining clip according to the concepts of the present invention.

Referring now to FIGS. 17 and 18, it can be seen that the sub-assembly 99 is receivable on the receiving port 28. The receiving port 28 provides a tubular duct 150 which is sized to be received within the cuff 24. The tubular duct 150 provides an exterior surface 152 that is opposite an interior surface 154. The interior surface 154 provides an opening 156 that is contiguous with the duct opening 36 when the sub-assembly 99 is joined to the port 28. As skilled artisans will appreciate, the openings allow for the flow of air or other gaseous material between the tubular body 22 and the port 28. An end surface 158 connects the exterior surface 152 to the interior surface 154. In the present embodiment, the exterior surface 152 provides for an entry ramp 162 that angularly extends from the end surface 158. A catch surface 164 extends from the entry ramp 162 to the exterior surface 152. Skilled artisans will appreciate that the ramp 162 may be angular as shown or it may be configured such that the entry ramp is of a perpendicular configuration. In any event, the catch surface 164 extends into a collar surface 166 which is substantially of the same diameter as the exterior surface 152. Extending from the collar surface 166 is an annular ridge 167 that provides a chamfer ramp 168 which terminates at a ridge surface 170. Extending perpendicularly from the ridge surface 170 is a ridge wall 172 that terminates at the exterior surface 152.

As best seen in FIG. 18, when the receiving port 28 is received in the cuff 24 certain components of each part are aligned with one another. In particular, the entry ramp 162 is received in the channel 82 and the chamfer ramp 168 is positioned adjacent the chamfer 74. When the sub-assembly 99 and the port 28 are assembled to one another and secured to one another with the clip 30, the cuff rim 54 and the ridge wall 72 are both captured between the retention wall surface 116 and the cuff wall surface 112. In particular, the retention wall surface 116 is adjacent the ridge wall 172, and the groove sidewall 60 adjacent the cuff ring 54 is adjacent the cuff wall surface 112. The spacing between the surfaces is such that the mating parts are maintained in adjacent contact to one another.

Assembly of the sub-assembly 99 with the receiving port may be accomplished in two ways. In one embodiment, the clip 30 may be pre-installed onto the cuff. This may be done by slightly expanding the arcuate fingers 104 so as to be received onto the cuff such that the tips 106 are positioned to be in proximity to the groove endwalls 64. As such, the clip may be assembled shortly after the molding of the cuff onto the tubular body while the cuff material is still warm. The cuff material is somewhat more pliable than would otherwise be experienced and the retaining clip is easily disposed onto the cuff groove. This avoids the operation of pre-assembling a band clamp onto the cuff and utilization of a tool such as a screwdriver. Skilled artisans will appreciate that hand-assembly of the components is easily accomplished and in much less time. In any event, with the clip pre-assembled to the cuff, the sub-assembly 99 can be axially inserted onto the receiving port 28. In such an operation, the entry ramp 162 may engage the chamfers provided by the central chamfer 138 and the end chamfers 144. If such an engagement occurs, the clip 30 may expand radially outwardly and effectively increase its outer diameter so as to allow for the ramps 162 to pass adjacent the fin wiper 78 and into the channel 82. Skilled artisans will appreciate that the fin wiper 78 provides for a sealing surface against the collar surface 166. As the sub-assembly is further inserted onto the port 28, the chamfer ramp 168 engages the chamfer surfaces of the protuberances 136, 142 to expand the clip radially outwardly. However, once the ridge surface 170 passes the protuberances, the clip and its associated spring force causes the retention wall to retract toward its normal size. This functions to capture the chamfer ramp 168 adjacent the chamfer 174 and, as such, the cuff is captured onto the receiving port 128 while also providing for a secure seal between the two components.

In some embodiments, depending upon the sizing of the rim groove 120 (the space between the wall surfaces 112 and 116), the retention wall 114 and the cuff wall 110 may exert a compressive force on the sidewall 60 of the cuff rim 54 and the ridge wall 172.

In an alternative assembly procedure, the sub-assembly 99, without the clip, is axially positioned onto the receiving port 28. In this manner, the entry ramp 162 is received in the channel 68 and the chamfer ramp 168 is positioned adjacent the chamfer 74. At this time, a technician will spread apart the retaining clip and position it such that the cuff ring 54 and the ridge surface 170 and ridge wall 172 are received between the wall surfaces 112 and 116. The fin wipers function as previously described and provide a seal of the cuff onto the collar surface 166. The positioning of the sub-assembly and the receiving port, when assembled to one another, is the same as described in the previous embodiment.

Removal of the retaining clip is essentially performed in the reverse manner of the embodiments described above. In one embodiment, a technician may simply grasp the tap 102 and pull radially. This forces the fingers 106 to expand the arcuate fingers 104 until such time that the tips 106 pass the largest portion of the outer diameter of the cuff groove.

Figure 19D:
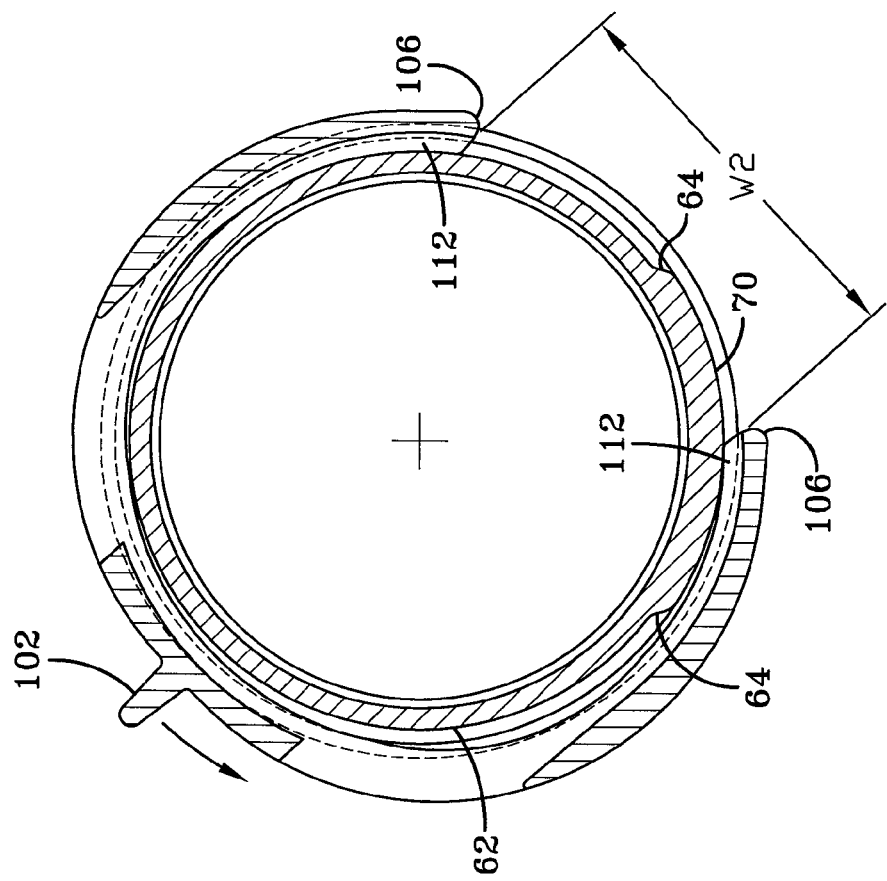
FIG. 19D is a cross-sectional view of the clip rotated with respect to the cuff so as to allow for removal of the clip according to the concepts of the present invention.
Figure 19C:
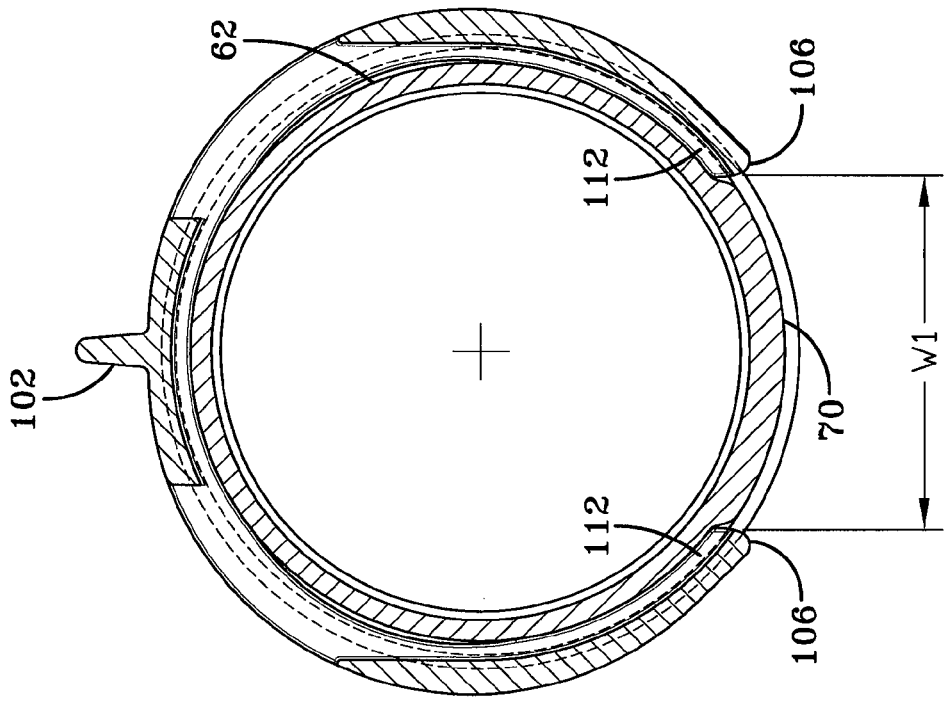
FIG. 19C is a cross-sectional view of the clip installed on the cuff in an installed condition.

In another embodiment, the technician rotates the tab 102 such that one of the fingers 106, and in particular the cuff wall 110, engages the adjacent groove endwall 64 and then the clip expansion surface 70. This can best be seen in FIGS. 19A-D. FIG. 19A shows a cross-section of the clip and, in particular, the cuff wall surface 112. FIG. 19B shows the cuff, and in particular, the cuff surface 62, one of the groove sidewalls 60, and how the surface 62 is terminated at the groove endwalls 64. This view further illustrates that the groove endwall 64 may be tapered so as to transition the cuff surface 62 into the clip expansion surface 70. FIG. 19C shows the clip received in the cuff groove 26 and further illustrates the positional relationship between the tips 106 of the arcuate fingers 104 and the groove endwalls 64. As shown in FIG. 19C, the spacing between the tips 106 is identified as width W1. As previously discussed, this spacing provides for a compressive force about the cuff so as to seal about the receiving port. In any event, dislodging of the clip is accomplished by rotating the clip, and in particular the tab 102, in a clockwise or counter-clockwise direction. This rotation forces the tip, and in particular the cuff wall 110, to engage the clip expansion surface 70. As shown in FIG. 19D, this causes the tips to expand to a dimension of width W2 which is larger than width W1. Skilled artisans will appreciate that the width dimensional values are particular to the size of the receiving port and the cuff and may be modified as needed, depending upon the size of the receiving port and cuff. In any event, once the tips, and in particular the cuff wall, are supported by the cliff expansion surface, the technician may exert an axial force so as to move the cuff wall onto the cuff expansion ring 98 shown in the other drawings. This effectively disengages the clip from the cuff grove and the technician further applies an axial force which completely disengages the clip from the cuff. As previously noted, the clip expansion surface 70 has the same outer diameter as the cuff expansion ring 98, such that as one of the fingers passes onto the clip expansion surface 70, it expands to a diameter that allows for it to be axially removed and positioned off of the interconnection between the cuff and the tubular body. Once this occurs then the retaining clip can be spread apart and easily removed. This then allows for the sub-assembly 99 to be axially withdrawn from the receiving port 28.

Based on the foregoing, the advantages of the present invention are readily apparent. The wiper fin allows for sealing onto the receiving port and allows for the cuff to be constructed from a relatively soft and flexible material so as to provide a circumferential seal around the receiving port. The fin size and the number of fins can be optimized for particular applications and the fin configuration may be configured to adapt to any changes in position or vibration of the receiving port or sub-assembly. Yet another advantage of the present invention is that it allows for quick assembly of the clip to the tubular body and for quick assembly of the sub-assembly to the receiving port. No tooling is required for such a configuration and, as a result, a cost savings is realized in the assembly of both the clip to the cuff, and in the sub-assembly to the receiving port. By utilizing a polymeric material for the clip it will be appreciated that no metallic components are required and this eliminates the possibility of metallic corrosion in the engine compartment, facilitates recycling and potentially lowers the overall weight of the assembly.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A method of assembling a clean air duct to a receiving port with a retaining clip, comprising:
   providing a receiving port which has an external surface with at least one mating angular surface;
   providing a tubular body with a cuff extending from said tubular body, said cuff having a cuff groove, said cuff also having an interior surface with at least one angular surface;
   providing a retaining clip with opposed walls, wherein one of said walls is at least partially received in said cuff groove;
   positioning said tubular body and said retaining clip on to said receiving port so that said at least one mating angular surface is positioned to be adjacent said at least one angular surface;
   deflecting said retaining clip so as to allow said at least one mating angular surface and said adjacent at least one angular surface to come into sealing contact with one another between said opposed walls of said retaining clip; and
   providing an annular fin extending from said at least one angular surface and axially aligned with said cuff groove, said annular fin compressed adjacent said external surface after deflecting said retaining clip.

2. The method according to claim 1, further comprising:
   installing said retaining clip on to said cuff groove prior to positioning said tubular body on to the receiving port.

3. The method according to claim 2, further comprising:
   providing said retaining clip with deflectable arcuate fingers, wherein each said arcuate finger has a radially inwardly extending protuberance; and
   contacting said protuberances with said receiving port so as to move said deflectable arcuate fingers outwardly until said protuberances are no longer deflected.

4. The method according to claim 1, further comprising:
   installing said retaining clip on to said cuff groove after positioning said tubular body on to the receiving port.

5. The method according to claim 4, further comprising:
   providing said receiving port with a ridge;
   providing said retaining clip with deflectable arcuate fingers, each said finger having said opposed walls comprising a retention wall and a cuff wall with a rim groove therebetween.

6. The method according to claim 5, further comprising:
   providing said cuff with a cuff rim adjacent said cuff groove; and
   capturing said cuff rim and said ridge in said rim groove.

7. The method according to claim 1, further comprising:
   rotating said retaining clip so that one of said opposed walls is deflected out of said cuff groove so that said retaining clip can be removed from said cuff groove; and
   disassembling said tubular body from said receiving port.

8. A clean air duct assembled to a receiving port with a retaining clip, comprising:
   a receiving port having an annular ridge;
   a tubular body;

a cuff extending from said tubular body, said cuff having an exterior cuff groove and said cuff having a cuff rim adjacent said exterior cuff groove, said cuff having an interior surface with a radially inward wiper that is axially aligned with said cuff groove; and a retaining clip having a retention wall and a cuff wall which form a rim groove therebetween, wherein said rim groove captures said annular ridge and said cuff rim so as to secure said tubular body and said cuff to said receiving port.

9. The clean air duct assembled to a receiving port with a retaining clip according to claim 8, wherein said cuff has an interior surface with an inwardly extending fin that seals around said receiving port.

10. The clean air duct assembled to a receiving port with a retaining clip according to claim 9, wherein said retaining clip comprises a pair of arcuate fingers, each of which has said retention wall and said cuff wall, said retention wall having radially inwardly extending protuberances which are engaged by said receiving port which, in turn, deflects said arcuate fingers until said annular ridge is received in said rim groove.

11. The clean air duct assembled to a receiving port according to claim 8, wherein said retaining clip further comprises an outwardly extending radial tab, wherein rotational movement of said tab allows disengagement of said cuff from said receiving port.

12. A clean air duct and retaining clip assembly for installation on a receiving port, the assembly comprising:
a tubular body;
a cuff extending from said tubular body, said cuff having a cuff groove, at least said cuff receivable on the receiving port wherein said cuff has an interior surface which comprises a radially inward wiper axially aligned with said cuff groove; and
a retaining clip only partially received in said cuff groove so as to secure said cuff and said tubular body to the receiving port.

13. The assembly according to claim 12, wherein said cuff extends radially and axially from said tubular body, said cuff having a cuff body secured to said tubular body and a rim at an end of said cuff opposite said tubular body, said cuff having an interior surface substantially shaped to conform to the receiving port.

14. The assembly according to claim 13, wherein said retaining clip comprises:
a clip body;
a cuff wall extending from one side of said clip body; and
a retention wall extending from an opposite side of said clip body, said cuff wall and said retention wall forming a rim groove therebetween, wherein said rim groove receives said rim and at least a portion of the receiving port.

15. The assembly according to claim 14, wherein said clip body comprises opposed arcuate fingers, wherein each said arcuate finger includes said cuff wall and said retention wall, wherein said cuff walls of said arcuate fingers are received in said cuff groove, and wherein said cuff groove is formed by opposed groove sidewalls which are connected to one another by groove endwalls.

16. The assembly according to claim 15, wherein said clip body further comprises an outwardly extending radial tab extending from said clip body, wherein rotational movement of said tab forces one of said arcuate fingers over one of said groove endwalls and expands said arcuate fingers away from each other.

17. The assembly according to claim 14, wherein said clip body further comprises:
at least one protuberance extending from said retention wall.

18. A clean air duct and retaining clip assembly for installation on a receiving port, the assembly comprising:
a tubular body;
a cuff extending from said tubular body, said cuff having a cuff groove adjacent a rim, at least said cuff receivable on the receiving port, wherein said cuff groove is formed by opposed groove sidewalls which are connected to one another by groove endwalls; and
a retaining clip only partially received in said cuff groove so as to secure said cuff and said tubular body to the receiving port, said retaining clip comprising:
a clip body;
a cuff wall extending from one side of said clip body; and
a retention wall extending from an opposite side of said clip body, said cuff wall and said retention wall forming a rim groove therebetween, wherein said rim groove receives said rim,
wherein said clip body comprises:
opposed arcuate fingers, wherein each said arcuate finger includes said cuff wall and said retention wall, and wherein said cuff walls of said arcuate fingers are received in said cuff groove, and
an outwardly extending radial tab extending from said clip body, wherein rotational movement of said tab forces one of said arcuate fingers over one of said groove endwalls and expands said arcuate fingers away from each other.

19. The assembly according to claim 18, wherein said cuff extends radially and axially from said tubular body, said cuff having a cuff body secured to said tubular body and said rim at an end of said cuff opposite said tubular body, said cuff having an interior surface substantially shaped to conform to the receiving port.

20. The assembly according to claim 18, wherein said cuff has an interior surface which comprises a radially inward wiper.

21. The assembly according to claim 20, wherein said radially inward wiper is axially aligned with said cuff groove.

* * * * *